UNITED STATES PATENT OFFICE 2,503,452

MANUFACTURE OF DDT

Ralph S. Park, Swarthmore, Pa., assignor to Allied Chemical & Dye Corporation, a corporation of New York No Drawing. Application June 17, 1947, Serial No. 755,259

8 Claims. (Cl. 260—649)

This invention relates to the manufacture of 2,2-bis-(p-chlorophenyl)-1,1,1-trichlor ethane, commonly known and hereafter referred to as DDT. In particular this invention is directed to the purification of crude DDT.

DDT is well known as an important ingredient of insecticides and is often stored as a solid material in dry form prior to its incorporation into insecticidal compositions. It is accordingly essential that DDT be of high purity and that its stability be sufficiently great to avoid decomposition during storage, especially for long periods and at elevated temperature.

As is well known, crude DDT is produced by reaction of chloral with monochlorobenzene in the presence of an acid-reacting condensing agent such as oleum or sulfuric acid. The purification of crude DDT has been carried out in several ways. One method involves washing the crude acid-containing DDT first with water, then with sodium carbonate solution, and finally with water, followed by drying the wet DDT. The product obtained by this process is of relatively low thermal stability and frequently develops yellow discoloration during the purification steps. Other purification procedures require use of organic solvents and involve more complicated handling and processing of the DDT.

One object of my invention is to produce DDT of high purity and stability. A further object is to treat crude DDT by a simple procedure involving a minimum of expense to obtain a purified and stabilized product without discoloration.

Further objects will appear as the description of my invention proceeds.

I have found that if crude molten acid-containing DDT is treated with calcium oxide, barium oxide, magnesium oxide or lead oxide, in substantially dry form, the DDT recovered from such treatment is largely free from discoloration and impurities and has a surprisingly high stability to heat. More specifically, one of the above metallic oxide stabilizing agents, e. g., calcium oxide, is incorporated into crude molten DDT of low acid content, the quantity of stabilizing agent employed being in excess of that required to neutralize the acidity of the crude DDT. The resulting mixture or suspension is then agitated and maintained at elevated temperature for a period of time sufficient to allow the calcium oxide to neutralize the acidity of the crude DDT and to evaporate off substantially all the water present therein, and the resultant mixture is filtered while hot to recover purified and stabilized DDT as filtrate.

In a preferred manner of carrying out the process of my invention I proceed in the following manner: Crude molten DDT, obtained from the reaction or condensation of chlorobenzene and chloral in the presence of sulfuric acid and separation of the acid layer from the DDT layer, is washed with hot water to reduce its content of free sulfuric acid to less than 1%, ordinarily 0.2 to 0.5%. After separation from the wash water by stratification, the molten DDT is treated with an excess of dry metal oxide to effect neutralization. Preferably the amount of oxide employed is from 1.5 to 3 times the amount theoretically equivalent to the free acid content of the DDT. While keeping the resulting suspension agitated, the temperature thereof is raised to within the range of 110° to 180° C. and is thus maintained for a period of time sufficient to neutralize the remaining acidity of the DDT and boil off practically all of the water present therein. The resulting molten DDT containing suspended impurities is then filtered and the clear molten DDT filtrate may then be stored at a temperature above its melting point and/or processed to give the desired type of solid product.

Although the crude molten DDT prepared by the reaction above noted contains small amounts of various impurities such as free unreacted chloral, the major problem is to dispense with the comparatively large amount of free sulfuric acid remaining in the reaction mixture after separation of the bulk of the condensation acid. This crude molten DDT having a residual acid content as high as 3% calculated as $H_2SO_4$ can be directly treated with any of my stabilizing agents, e. g. calcium oxide, provided an excess of such agent is employed. However, in accordance with my invention, in order to minimize the amount of calcium oxide necessary for neutralization and at the same time cut down losses of DDT occluded in the correspondingly large quantity of filter cake obtained, it is preferably to subject the crude DDT to a single hot water wash first to reduce the free acid content of the crude DDT to a value less than 1%, and even more desirably to a value in the range of 0.2 to 0.5%, before treatment with any of the above metallic oxide stabilizing agents. The above washing step aids in reducing the DDT loss in the press cake to less than 2%.

As the preferred alkaline stabilizing agent, I employ calcium oxide. All of the above metal oxide compounds are employed in the dry powder form. As already noted these compounds are utilized in excess of the amount required to neutralize the free acid content of the crude DDT and preferably in amounts ranging from 1.5 to 3 times that necessary to eliminate residual acidity. While lesser quantities may be employed, experience shows that, with respect to both acid neutralization and ease of subsequent filtering, the indicated excesses of oxide afford the best results. Further, a greater excess of oxide may be used than that above indicated, but offers no advantage while at the same time causing production of large filter cakes with consequent loss of occluded DDT and decreased filtration rates.

The temperature during treatment of the molten DDT with the above alkaline metallic oxide stabilizing agents may vary from about 110° C. to 180° C. and preferably is maintained within the range of 125° to 140° C. However, for best operation involving obtention of high filtration rates a temperature in the range of 130° to 135° C. is most desirable. Temperatures lower than 110° C. do not afford complete removal of residual water without use of a vacuum, and substantially complete removal of water from the DDT prior to filtration is important to render any contaminating inorganic salts present insoluble in the DDT melt. Temperatures above 180° C. are undesirable in that decomposition of DDT commences under such conditions. The time of treatment may vary depending on the particular metal oxide and temperature employed but should be of sufficient length to bring about neutralization of all the free acid present in the DDT and evaporation of substantially all the water present. Utilizing calcium oxide and a temperature of about 135° C., a time of treatment from ½ to 1 hour is usually sufficient where the free acid content of the crude DDT being treated is less than 1% calculated as $H_2SO_4$. Where lead oxide (PbO) is used as the neutralizing agent, it is desirable to maintain the mixture, after the neutralization treatment, at elevated temperature for a substantial period, e. g., for 24 hours at 100° C. before filtering. While the molten DDT is being treated, the mixture is agitated to keep the solid matter in suspension.

During the treatment period a small amount of zinc powder or dust may be added to the molten DDT-metallic oxide mixture to control the free chloral content of the DDT. However, this expedient is entirely optional, and it has often been found in practice that the incorporation of zinc powder into the above mixture is not necessary to produce a satisfactory product.

After treatment of the DDT with the above noted metallic oxides, the suspension is filtered while hot. During filtration the temperature of the suspension is maintained about the same as that maintained during treatment of the DDT with the stabilizing metallic oxide, namely, in the range of about 110° to 180° C. Preferably, temperature during filtration is kept in the range of about 125° to 140° C. with optimum conditions for operation in the range of about 130° to 135° C. Any suitable type of filter apparatus may be employed. However, for commercial operation a steam-jacketed plate and frame press has been found satisfactory, the steam pressure therein being regulated to obtain the desired temperature of filtration. To realize economic rates of filtration, the DDT-metallic oxide suspension is usually filtered under pressure. A filter aid, such as commercially available diatomaceous earth aids, may be added to the treated mixture or precoated on the filter cloth prior to filtration to enhance filter rate. When only 1.5 times the theoretical amount of calcium oxide necessary to neutralize the acidity of the DDT is employed, filtration rates are not very high and the use of filter aids is especially valuable in increasing filter rate. Rate of filtration may be improved without filter aids by increasing the excess of metallic oxide, e. g. calcium oxide, employed for treating the crude DDT.

A transparent substantially water clear neutral DDT filtrate is obtained on filtration. This filtrate may be run into storage tanks which are heated to keep the DDT in molten condition and the molten DDT may thereafter be further processed e. g. in flaker pans, to give the type of solid product desired, or the DDT filtrate may be directly processed to obtain a solid product. The DDT occluded in the press cake during filtration may be recovered by milling the cake into DDT dust mixtures.

The DDT produced by my process affords a solid product of superior color and high thermal stability giving a clear almost colorless melt and conforms to all current DDT specifications. DDT stabilized with the above metallic oxides may be heated to elevated temperature for prolonged periods without significant decomposition. Thus, for example, DDT treated with calcium oxide, magnesium oxide, barium oxide or lead oxide in the presence of zinc powder remains stable on heating for 14 hours at 115° C., 7 hours at 135° C. or 6 hours at 180° C. Both the color and thermal stability of these products are markedly superior to that of DDT products purified for example by an aqueous sodium carbonate wash.

Most of the discoloration of DDT purified by the known method involving the use of dilute alkaline washes to neutralize DDT acidity appears to take place during such washes and also in the vacuum drying pans for preparing the solid product. In accordance with my invention, by avoiding water and dilute alkaline washes and employing instead alkaline oxides of calcium, barium, magnesium, or lead, in substantially dry form, as the acid neutralizing agent under the conditions noted above, avoidance of discoloration and increased purity of the product result, in addition to an unusually high thermal stability.

The following detailed examples serve to illustrate my invention, all quantities being expressed in parts my weight:

Example 1

Crude DDT was prepared by condensing chloral with monochlorobenzene in the presence of oleum, separating the oleum from the reaction product by stratification and washing the resultant acid-containing DDT with water to reduce the free acid content to .92% calculated as $H_2SO_4$. To 4540 parts of this crude DDT product were added 38 parts of calcium oxide powder, about 1.6 times the theoretical equivalent required for neutralization, and 4 parts of zinc metal dust. The mix was agitated and heated to 130°–135° C. for about ½ hour. 40 parts diatomaceous earth filter aid were added to the mix which was then separated into three separate portions, each of which was filtered at a temperature of 130°–133° C. Clear almost colorless substantially neutral DDT filtrates of high stability were obtained.

Example 2

To 1601 parts crude DDT prepared as indicated in Example 1 and having a total acidity of .109% calculated as $H_2SO_4$ were added 2.6 parts calcium oxide, about 1.5 times the theoretical equivalent required for neutralization, and 1½ parts zinc metal dust. The mix was agitated and heated at 130° C. for about ½ hour. Filtration was then carried out at 130°-135° C., the filter cloths having been precoated with diatomaceous earth filter aid. A clear almost colorless DDT filtrate of high stability and having a pH of 7.0 (determined by the distillation method in conformity with the procedure described on page 6 of the Joint Army-Navy specification JAN-D-56A, March 16, 1945 for dichlorodiphenyl trichloroethane) was obtained.

*Example 3*

To 4540 parts of crude DDT prepared as indicated in Example 1 and having a total acidity of .4% calculated as $H_2SO_4$ were added about 33 parts of calcium oxide. The mix was agitated and heated to temperature ranging from 110° to 130° C. for about 1 and ½ hours. After all the water had boiled off, 4 parts of zinc dust were added and the mix was filtered at about 130° C. After filtration had commenced, 20 parts of diatomaceous earth filter aid were added to the suspension to increase filter rate. A clear almost colorless DDT filtrate of high stability and having a pH of about 7 (determined as in Example 2) was obtained.

*Example 4*

Crude DDT having a total acidity of 0.25% calculated as $H_2SO_4$ was prepared as indicated in Example 1. To each of three separate portions each containing 200 parts of this crude DDT were added 1.55 parts barium oxide, 0.42 part magnesium oxide and 2.23 parts lead oxide (PbO) respectively. The amount of oxide employed in each case was about twice the theoretical equivalent required for neutralization. Each of the three mixtures was agitated and heated to about 130° C. for a short time followed by filtering a portion of each mixture. Each of the DDT filtrates thus obtained was clear and almost colorless. After being held at a temperature of 115° C. for about 60 hours the foregoing filtrates were still clear and had taken on only a light yellow coloration. Holding the various filtrates at higher temperatures of 130°-135° C. for 4 additional hours resulted in no further noticeable change in their appearance.

I claim:

1. The process of purifying and stabilizing crude acid-containing DDT produced by condensation of chloral with monochlorobenzene in the presence of sulfuric acid as condensing agent, which comprises contacting the crude molten DDT containing sulfuric acid in quantity not above 3% $H_2SO_4$, with a compound of the group consisting of calcium oxide, barium oxide, magnesium oxide and lead oxide, in substantially dry form, at a temperature in the range of 110° C.-180° C., said compound being employed in excess of that required to neutralize said acidity, filtering the resulting mass at a temperature within the range of 110-180° C. and recovering purified and stabilized DDT as filtrate.

2. The process of stabilizing and purifying DDT which comprises incorporating in crude molten DDT containing sulfuric acid in quantity not above 3% $H_2SO_4$, calcium oxide in substantially dry form and in amount ranging from 1.5 to 3 times the theoretical quantity necessary to neutralize said acidity, heating the resulting mixture to a temperature within the range of 125-140° C. for a period of time sufficient to neutralize the acidity of said molten DDT and to evaporate substantially all the water present, filtering the resulting mass at a temperature within the range of 125°-140° C., and recovering purified and stabilized DDT as filtrate.

3. The process as defined in claim 2 wherein a small amount of zinc is added to the molten DDT during treatment with the calcium oxide.

4. The process as defined in claim 1 in which the compound employed is calcium oxide.

5. The process as defined in claim 1 in which the compound employed is barium oxide.

6. The process as defined in claim 1 in which the compound employed is magnesium oxide.

7. The process of stabilizing and purifying DDT which comprises incorporating in crude molten DDT containing sulfuric acid in quantity not greater than 1% $H_2SO_4$, calcium oxide in substantially dry form and in amount ranging from 1.5 to 3 times the theoretical quantity necessary to neutralize said acidity, heating the resulting mixture to a temperature within the range of 125°-140° C. for a time sufficient to neutralize the acidity of said molten DDT and to evaporate substantially all the water present therein, filtering the resulting mass at a temperature within the range of 125°-140° C. and recovering purified and stabilized DDT as filtrate.

8. The process of stabilizing and purifying DDT which comprises washing crude molten DDT containing sulfuric acid with water to reduce its free acid content to from .2 to .5% $H_2SO_4$, incorporating in the resulting molten DDT calcium oxide in substantially dry form and in amount ranging from 1.5 to 3 times the theoretical quantity necessary to neutralize said free acid content, heating the resulting mixture to a temperature in the range of about 130°-135° C. for a time up to 1 hour, filtering the resulting mass at a temperature in the range of 130°-135° C. and recovering purified and stabilized DDT as filtrate.

RALPH S. PARK.

REFERENCES CITED

The following references are of record in the file of this patent:

UNITED STATES PATENTS

| Number | Name | Date |
|---|---|---|
| 2,076,430 | Hanson et al. | Apr. 6, 1937 |
| 2,461,852 | Stein et al. | Feb. 15, 1949 |

FOREIGN PATENTS

| Number | Country | Date |
|---|---|---|
| 547,874 | Great Britain | Sept. 15, 1942 |

OTHER REFERENCES

Gunther et al., "Science," vol. 104, pages 203-4 (1946).